United States Patent
Kato

(10) Patent No.: US 9,843,267 B2
(45) Date of Patent: Dec. 12, 2017

(54) CONVERTER UNIT SYSTEM HAVING INRUSH-CURRENT SUPPRESSION CIRCUIT

(71) Applicant: Mitsubishi Electric Corporation, Tokyo (JP)

(72) Inventor: Masanori Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/118,949

(22) PCT Filed: Mar. 19, 2015

(86) PCT No.: PCT/JP2015/058370
§ 371 (c)(1),
(2) Date: Aug. 15, 2016

(87) PCT Pub. No.: WO2016/147413
PCT Pub. Date: Sep. 22, 2016

(65) Prior Publication Data
US 2017/0070158 A1    Mar. 9, 2017

(51) Int. Cl.
*H02M 5/45* (2006.01)
*H02M 7/06* (2006.01)
(Continued)

(52) U.S. Cl.
CPC .............. *H02M 7/06* (2013.01); *H02M 1/32* (2013.01); *H02M 1/36* (2013.01); *H02M 5/458* (2013.01); *H02M 7/08* (2013.01); *H02P 27/06* (2013.01)

(58) Field of Classification Search
CPC . H02M 2001/0045; H02M 2001/0067; H02M 2001/007; H02M 2001/0074;
(Continued)

(56) References Cited

U.S. PATENT DOCUMENTS 5,594,285 A * 1/1997 Wisbey .................. B64D 41/00
307/18
5,949,663 A    9/1999 Endo et al.
(Continued)

FOREIGN PATENT DOCUMENTS

JP       59-70185 A    4/1984
JP       62-166779 A   7/1987
(Continued)

OTHER PUBLICATIONS

Decision of a Patent Grant of Japanese Patent Application No. 2016-513934, dated May 17, 2016.
(Continued)

*Primary Examiner* — Jeffrey Gblende
*Assistant Examiner* — David A. Singh
(74) *Attorney, Agent, or Firm* — Sughrue Mion, PLLC; Richard C. Turner

(57) ABSTRACT

In a converter unit system, converter units are connected in parallel. The converter unit includes a converter circuit connected to an AC power supply and a DC bus, a first inrush-current suppression resistor connected to the DC bus, a first contactor connected in parallel to the first inrush-current suppression resistor, a smoothing capacitor provided after the first inrush-current suppression resistor and the first contactor, a second contactor externally outputting ON/OFF signal, a voltage detection unit measuring a DC voltage value across the smoothing capacitor, and a control unit controlling the first contactor and the second contactor. The converter unit system includes a third contactor connected to the converter units, and a second inrush-current suppression resistor connected in parallel to the third contactor. When contacts of the second contactors are all closed, a contact of the third contactor is closed.

7 Claims, 4 Drawing Sheets

(51) Int. Cl.
 *H02M 7/08* (2006.01)
 *H02M 1/32* (2007.01)
 *H02M 1/36* (2007.01)
 *H02M 5/458* (2006.01)
 *H02P 27/06* (2006.01)

(58) Field of Classification Search
 CPC .. H02M 2001/0077; H02M 1/32; H02M 1/36; H02M 5/458; H02M 7/06; H02M 7/08
 See application file for complete search history.

(56) References Cited

U.S. PATENT DOCUMENTS

| | | | | |
|---|---|---|---|---|
| 6,157,097 | A * | 12/2000 | Hirose | H02M 7/062 307/125 |
| 6,710,988 | B1 * | 3/2004 | Yee | H02H 7/0822 361/104 |
| 9,397,580 | B1 * | 7/2016 | Alexander | H02M 3/1582 |
| 2002/0070821 | A1 * | 6/2002 | Moller | H03H 1/0007 333/181 |
| 2003/0025399 | A1 * | 2/2003 | Brown | B60K 6/46 307/77 |
| 2007/0053215 | A1 * | 3/2007 | Wang | H02M 7/062 363/53 |
| 2007/0138993 | A1 * | 6/2007 | Tanaka | H01H 47/04 318/762 |
| 2010/0080022 | A1 * | 4/2010 | Schmidt | H02M 7/062 363/53 |
| 2010/0246217 | A1 * | 9/2010 | Sakakibara | H02M 1/32 363/37 |
| 2011/0309809 | A1 * | 12/2011 | Rao | H03K 17/167 323/282 |
| 2013/0003429 | A1 | 1/2013 | Murahashi | |
| 2013/0106328 | A1 * | 5/2013 | Kopiness | H02M 1/36 318/400.11 |
| 2013/0336028 | A1 * | 12/2013 | Kawamura | H02M 7/125 363/53 |
| 2015/0270789 | A1 * | 9/2015 | Shi | H02M 3/33569 363/65 |
| 2015/0280603 | A1 * | 10/2015 | Yuasa | H02M 5/458 363/37 |
| 2016/0211763 | A1 * | 7/2016 | Wang | H02M 5/4585 |
| 2016/0268797 | A1 * | 9/2016 | Li | H02M 5/4585 |

FOREIGN PATENT DOCUMENTS

| | | |
|---|---|---|
| JP | 63-3657 A | 1/1988 |
| JP | 5-76135 A | 3/1993 |
| JP | 7-308020 A | 11/1995 |
| JP | 7-322484 A | 12/1995 |
| JP | 9-56081 A | 2/1997 |
| JP | 10-257767 A | 9/1998 |
| JP | 11-27941 A | 1/1999 |
| JP | 11-41943 A | 2/1999 |
| JP | 2000-78603 A | 3/2000 |
| JP | 2001-45795 A | 2/2001 |
| JP | 2001-298857 A | 10/2001 |
| JP | 2005-257266 A | 9/2005 |
| JP | 2007-74884 A | 3/2007 |
| JP | 2007-151235 A | 6/2007 |
| JP | 2007-324843 A | 12/2007 |
| JP | 2008-17626 A | 1/2008 |
| JP | 2011-139607 A | 7/2011 |
| WO | 2011/104848 A1 | 9/2011 |

OTHER PUBLICATIONS

International Search Report of PCT/JP2015/058370, dated Jun. 23, 2015. [PCT/ISA/210].

* cited by examiner

CONVERTER UNIT SYSTEM HAVING INRUSH-CURRENT SUPPRESSION CIRCUIT

CROSS REFERENCE TO RELATED APPLICATIONS

This application is a National Stage of International Application No. PCT/JP2015/058370 filed Mar. 19, 2015, the contents of all of which are incorporated herein by reference in their entirety.

FIELD

The present invention relates to a converter unit system that includes an inrush-current suppression circuit, and relates to a converter unit used in the converter unit system.

BACKGROUND

A semiconductor power conversion device includes a converter unit and an inverter unit. The converter unit of the semiconductor power conversion device includes a converter circuit that converts an alternating current to a direct current by a diode bridge to supply the direct current to the inverter unit, and a smoothing capacitor that removes ripple components from the DC voltage into which the converter circuit has converted the AC voltage. In some cases, the converter unit is provided with an inrush-current suppression circuit for suppressing flow of a high inrush current through diode elements within the diode bridge of the converter unit at the time of power-on to charge the smoothing capacitor of the converter unit and a smoothing capacitor within the inverter unit connected to the converter unit. The inrush-current suppression circuit is provided between the converter circuit and the inverter unit and includes an inrush-current suppression resistor and a contactor connected in parallel to the inrush-current suppression resistor.

An uninterruptible power supply device disclosed in Patent Literature 1 includes a rectifier, which is connected to an AC power supply to convert an input alternating current to a direct current; an inverter, which converts the direct current to an alternating current with a fixed voltage and a fixed frequency; a smoothing capacitor and a battery, which are connected to a DC intermediate circuit, which couples the DC side of the rectifier with the DC side of the inverter. The uninterruptible power supply device further includes an inrush-current suppression device. In the inrush-current suppression device described in Patent Literature 1, a current-limiting circuit configured by connecting a current-limiting resistance and a resistance short-circuit switch in parallel is inserted into the AC input side of the rectifier, a switching circuit configured by connecting a semiconductor switch element and an element short-circuit switch in parallel is inserted into the DC intermediate circuit, a first smoothing capacitor is connected between the switching circuit and the rectifier, and a second smoothing capacitor and the battery are connected between the switching circuit and the inverter.

CITATION LIST

Patent Literature

Patent Literature 1: Japanese Patent Application Laid-open No. H5-76135

SUMMARY

Technical Problem

As described above, the converter unit that includes the inrush-current suppression circuit turns off the contactor within the inrush-current suppression circuit at the time of power-on, so that the smoothing capacitor is charged with a current from the power supply through the inrush-current suppression resistor. Due to this configuration, an inrush current that is generated at the time of power-on to charge the smoothing capacitor can be suppressed by the inrush-current suppression resistor. Further, in the converter unit, when the DC voltage detected by a voltage detection unit exceeds a set threshold, a control unit turns on the contactor in the inrush-current suppression circuit. When the converter unit is turned off, if the DC voltage detected by the voltage detection unit becomes equal to or lower than the set threshold, the control unit turns off the contactor in the inrush-current suppression circuit. Accordingly, the converter unit can protect electrical parts such as diode elements of the converter unit from an inrush current at the time of power-on.

In some cases, the semiconductor power conversion device uses a converter unit system in which a plurality of converter units are connected in parallel. In the case where the converter units are connected in parallel to construct a high-capacity converter unit system, variation occurs in the voltage detection thresholds of the respective voltage detection units of the converter units connected in parallel, and variation occurs in the voltages input to the contactor in the inrush-current suppression circuit when a contact of the contactor operates. Therefore, when the power is turned on again or the power supply is restored after an instantaneous power interruption, only the contactor in the inrush-current suppression circuit of one of the converter units is brought to an ON state, so that the flow of an inrush current generated when charging the smoothing capacitor concentrates in this converter unit. Thus, there is a possibility that a large current flows through the diode elements that constitute the diode bridge.

If an inrush-current suppression circuit is provided outside the converter units in order to solve the above problem, it is necessary to provide a voltage detector and a controller for switching on or off the contactor within the inrush-current suppression circuit provided outside the converter unit. This configuration makes the system more complicated.

The present invention has been achieved to solve the above problems, and an object of the present invention is to provide a converter unit system and a converter unit that can take an average of the amounts of inrush current flowing through respective converter units connected in parallel.

Solution to Problem

To solve the above problem and achieve the object, an aspect of the present invention is a converter unit system in which a plurality of converter units are connected in parallel, wherein each of the converter units is connected to an AC power supply and a DC bus, and comprises: a converter circuit that rectifies an AC voltage input from the AC power supply to a DC voltage, and outputs the DC voltage to the DC bus; a first inrush-current suppression resistor that is connected to the DC bus; a first contactor that is connected in parallel to the first inrush-current suppression resistor; a smoothing capacitor that is provided on the DC bus on a side further from the AC power supply than the first inrush-current suppression resistor and the first contactor; a second contactor that outputs an ON signal or an OFF signal to an external source; a voltage detection unit that measures a value of DC voltage across both ends of the smoothing capacitor, and a control unit that controls the first contactor and the second contactor on a basis of the value of DC voltage detected by the voltage detection unit, and the converter unit system comprises: a third contactor that is connected to the converter units, wherein when contacts of the second contactors of the converter units are all closed, a contact of the third contactor is closed, and when at least one of the contacts of the second contactors is opened, the contact of the third contactor is opened; and a second inrush-current suppression resistor that is connected in parallel to the third contactor.

Advantageous Effects of Invention

The present invention can take an average of the amounts of inrush current flowing through respective converter units connected in parallel.

BRIEF DESCRIPTION OF DRAWINGS

FIG. 2 is a diagram illustrating a relation between a control signal of a first contactor and a DC-voltage detection value when the converter unit according to the first embodiment is turned on.

FIG. 4 is a diagram illustrating a relation between a control signal of a first contactor and a control signal of a second contactor and a DC-voltage detection value when a converter unit system according to a second embodiment is turned on.

FIG. 6 is a diagram illustrating a relation between a control signal of a first contactor and a control signal of a second contactor and a DC-voltage detection value when a converter unit system according to a third embodiment is turned on.

DESCRIPTION OF EMBODIMENTS

Exemplary embodiments according to the present invention will be explained below in detail with reference to the accompanying drawings. The present invention is not limited to the embodiments.

First Embodiment

Figure 1:
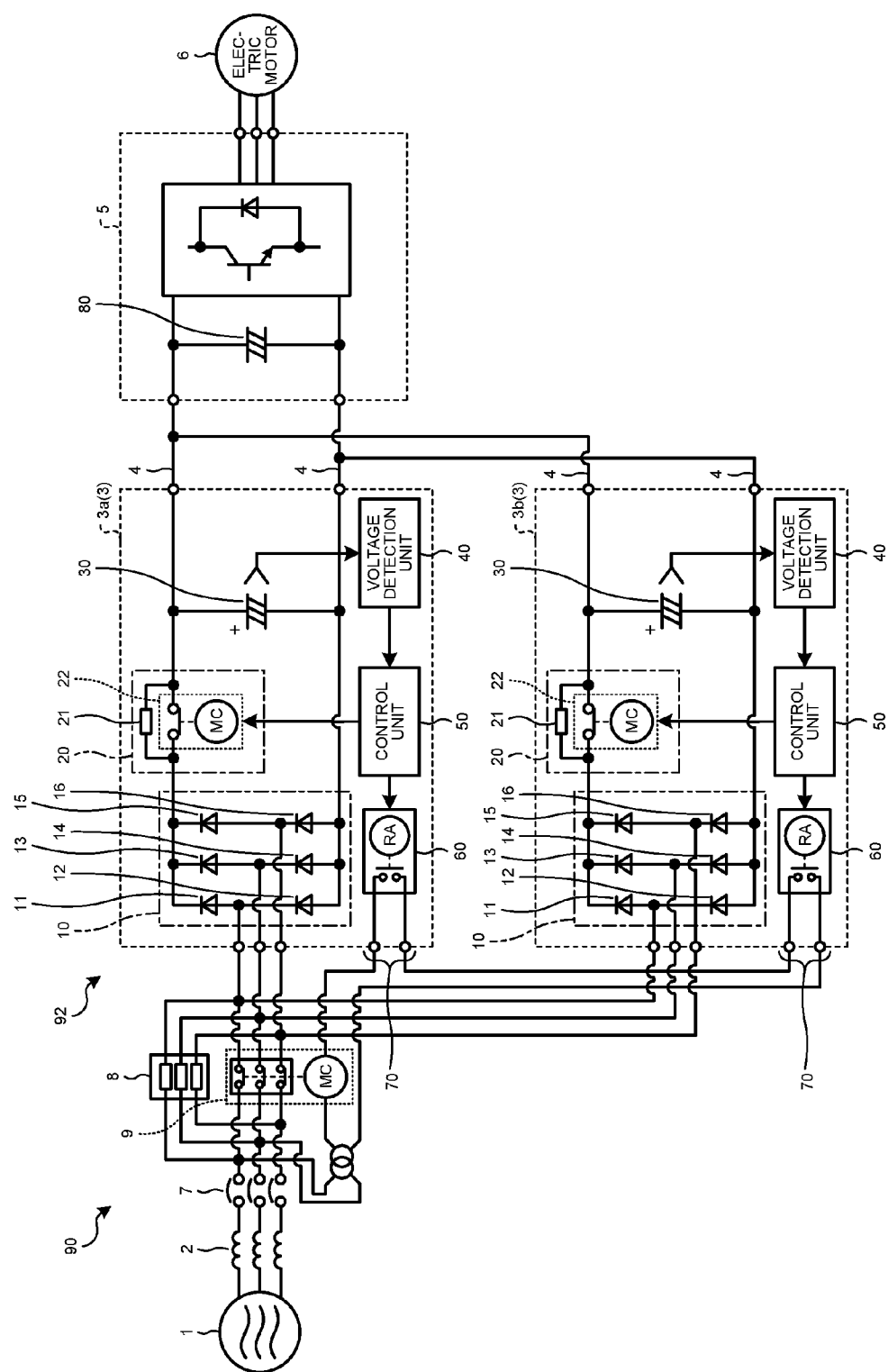
FIG. 1 is a diagram illustrating a configuration of a power-supply circuit including a plurality of converter units according to a first embodiment.

FIG. 1 is a diagram illustrating a configuration of a power-supply circuit including a plurality of converter units according to a first embodiment of the present invention. A power-supply circuit 90 illustrated in FIG. 1 converts an AC voltage supplied from an AC power supply to a direct current, and thereafter converts the direct current to an alternating current again to supply the alternating current to an electric motor. The electric motor that is used can be various devices (loads) that are driven by power. The power-supply circuit 90 includes an AC power supply 1; a reactor 2; converter units 3 (3a and 3b), which include two first inrush-current suppression resistors 21; a DC bus 4; an inverter unit 5; an electric motor 6; a breaker 7; a second inrush-current suppression resistor 8; and a third contactor 9. In the power-supply circuit 90, the converter units 3, the second inrush-current suppression resistor 8, and the third contactor 9 are combined into a converter unit system 92.

In the power supply circuit 90, an AC voltage is input from the AC power supply 1 through the reactor 2, the breaker 7, and the third contactor 9 to each of the converter units 3. The second inrush-current suppression resistor 8 is in parallel to the third contactor 9, and connected to the breaker 7 and each of the converter units 3. The converter unit 3 converts the input AC voltage to a DC voltage and outputs the DC voltage to the DC bus 4. The DC voltage into which the converter unit 3 has converted the AC voltage is input through the DC bus 4 to the inverter unit 5. The inverter unit 5 converts the DC voltage input from the converter unit 3 to an AC voltage having a frequency that matches the operating frequency of the electric motor 6. The AC voltage, into which the inverter unit 5 has converted the DC voltage, is output by the inverter unit 5 to the electric motor 6. The inverter unit 5 includes a smoothing capacitor 80 connected to the DC bus 4. The electric motor 6 is supplied with a an AC voltage from the inverter unit 5.

Because the converter units 3a and 3b have an identical configuration, these converter units 3a and 3b are hereinafter described as the converter unit 3. The converter unit 3 includes a converter circuit 10; an inrush-current suppression circuit 20; a smoothing capacitor 30; a voltage detection unit 40; a control unit 50; a second contactor 60; and terminals 70. An AC voltage is input to the converter unit 3 in the converter circuit 10. The converter circuit 10 includes diode elements 11, 12, 13, 14, 15, and 16. In the converter circuit 10, the diode elements 11, 12, 13, 14, 15, and 16 form a diode bridge to convert the input AC voltage to a DC voltage. The converter unit 3 outputs to the DC bus 4 the DC voltage obtained by converting the AC voltage.

The inrush-current suppression circuit 20 is provided on the DC bus 4 on the side closer to the inverter unit 5 than the converter circuit 10. The inrush-current suppression circuit 20 includes the inrush-current suppression resistor 21 and a first contactor 22. The inrush-current suppression resistor 21 is provided on the DC bus 4. The first contactor 22 is connected in parallel to the inrush-current suppression resistor 21. The first contactor 22 can be switched between opened and closed (ON or OFF) states. When the converter unit 3 is turned on, the inrush-current suppression circuit 20 places the first contactor 22 in the opened state; therefore, a current flows through the inrush-current suppression resistor 21 so as to suppress the flow of an inrush current generated when charging the smoothing capacitor 30.

The smoothing capacitor 30 is provided on the DC bus 4 on the side closer to the inverter unit 5 than the converter circuit 10 and the inrush-current suppression circuit 20. The smoothing capacitor 30 smoothes the DC voltage into which the converter circuit 10 has converted the AC voltage.

The voltage detection unit (a DC-voltage detection unit) 40 detects the value of the DC voltage applied across both ends of the smoothing capacitor 30. The voltage detection unit 40 outputs the detection result to the control unit 50. The control unit 50 is connected in series to the first contactor 22 and the second contactor 60. On the basis of the detection result in the voltage detection unit 40, the control unit 50 controls opening and closing (ON or OFF) of the first contactor 22 and the second contactor 60. This point is described later. The second contactor 60 switches the terminal 70 between an opened state and a closed state in order to determine whether to output a contact signal to an external source. The terminal 70 is connected to an external device.

The breaker 7 is provided for each of the three phases of the AC power supply 1, and is provided between the converter unit 3 and the reactor 2 of each phase. The second inrush-current suppression resistor 8 and the third contactor 9 are provided in parallel between the breaker 7 and the converter unit 3.

In the power-supply circuit 90, the coil-side terminal of the third contactor 9, connected to one phase of the AC power supply 1 through the breaker 7, is connected to one of the terminals 70 of the converter unit 3a. In the power-supply circuit 90, the other terminal 70 of the converter unit 3a is connected to one of the terminals 70 of the converter unit 3b. Further, in the power-supply circuit 90, the other terminal 70 of the converter unit 3b is connected to the coil-side terminal of the third contactor 9 connected to another phase of the AC power supply 1. In this case, wiring on the AC power supply 1 side to which the terminal 70 of the converter unit 3a is connected has a phase different from that of wiring on the AC power supply 1 side to which the terminal 70 of the converter unit 3b is connected.

Figure 2:
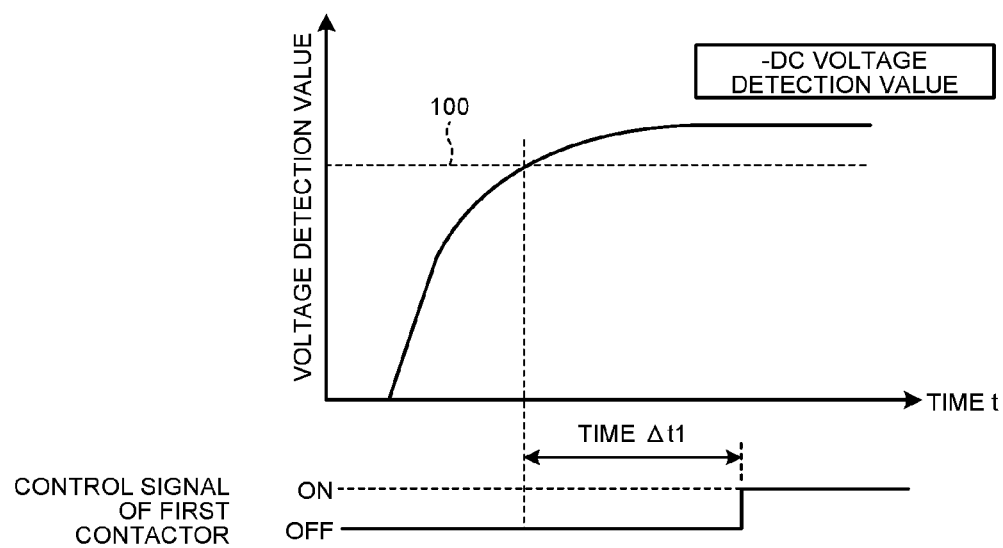
Figure 3:
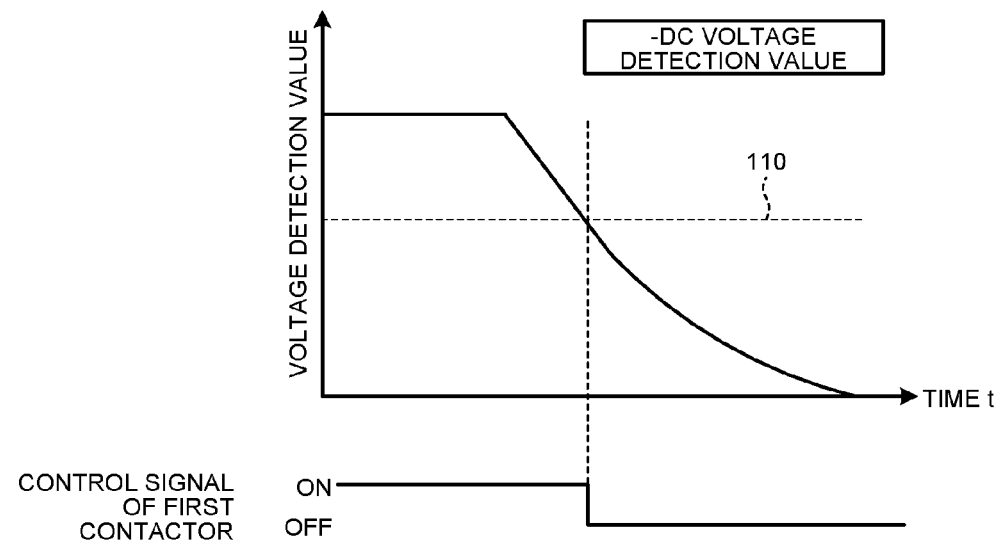
FIG. 3 is a diagram illustrating a relation between a control signal of the first contactor and a DC-voltage detection value when the converter unit according to the first embodiment is turned off.

Next, an operation of the converter unit 3 is described with reference to FIGS. 2 and 3. FIG. 2 is a diagram illustrating a relation between a control signal of the first contactor and a DC-voltage detection value (a measurement value) when the converter unit according to the first embodiment is turned off. FIG. 3 is a diagram illustrating a relation between a control signal of the first contactor and a DC-voltage detection value when the converter unit according to the first embodiment is turned off. On the basis of the detection result in the voltage detection unit 40, the control unit 50 outputs a signal for controlling the first contactor 22 such that the first contactor 22 is in the on or off state, and a signal for controlling the second contactor 60 such that the second contactor is in the on or off state.

Upon turning-on of the converter unit 3, the control unit 50 compares the value of the DC voltage across the both ends of the smoothing capacitor 30, that is, the DC-voltage detection value with a predetermined voltage threshold 100 at which the first contactor 22 is turned on, as illustrated in FIG. 2. After a lapse of a time $\Delta t1$ since the DC-voltage detection value exceeds the voltage threshold 100, the control unit 50 switches the signal for controlling the first contactor 22 from off to on. That is, the control signal to be output to the first contactor 22 is switched by the control unit 50 from an OFF control signal to an ON control signal. The first contactor 22 closes its contact when the ON control signal is input thereto. The time $\Delta t1$ is set, taking into account the fact that the value of the DC voltage across the both ends of the smoothing capacitor 30 is different for each of the converter units due to the capacitance tolerance of the smoothing capacitor 30.

At the same timing as outputting the control signal to the first contactor 22, the control unit 50 switches the signal for controlling the second contactor 60 from off to on. The second contactor 60 closes its contact when the ON control signal is input thereto. When the contact of the second contactor 60 is closed, the converter unit 3 outputs an ON or OFF signal to the outside of the converter unit 3 through the terminal 70 of the converter unit 3. When the contact of the second contactor 60 is closed, the contact of the third contactor 9 provided outside the converter unit 3 is closed, so that a path that does not pass through the second inrush-current suppression resistor 8 is formed between the breaker 7 and the converter unit 3. This completes the operation of suppressing an inrush current.

When the contact of the breaker 7 connected to the AC power supply 1 is closed to supply the power to the converter unit 3, the smoothing capacitor 30 of the converter unit 3 and also the smoothing capacitor 80 of the inverter unit 5 connected in series to the converter unit 3 are charged through the second inrush-current suppression resistor 8 provided outside the converter unit 3.

Next, upon turning-off of the power to the converter unit 3, the control unit 50 compares the DC-voltage detection value of the smoothing capacitor 30 with a predetermined voltage threshold 110 at which the first contactor 22 is turned off, as illustrated in FIG. 3. When the DC-voltage detection value of the smoothing capacitor 30 becomes equal to or smaller than the voltage threshold 110, the control unit 50 switches the signal for controlling the first contactor 22 from on to off. That is, the control signal to be output to the first contactor 22 is switched by the control unit 50 from the ON control signal to the OFF control signal. The first contactor 22 opens its contact when the OFF control signal is input thereto.

Simultaneously with outputting the control signal to the first contactor 22, the control unit 50 switches a signal for controlling the second contactor 60 (a control signal) from on to off. The second contactor 60 opens its contact when the OFF control signal is input thereto. In the power-supply circuit 90, when the contact of at least the other of the second contactors 60 of the converter units 3a and 3b is opened, the contact of the third contactor 9 provided outside the converter units 3a and 3b is opened, thereby performing an operation of interrupting a current that flows through the third contactor 9.

In the power-supply circuit 90, the converter unit system includes the converter units 3, the second inrush-current suppression resistor 8, and the third contactor 9. Even when two converter units 3 are connected in parallel, the signal output from the second contactor 60 included in the converter unit 3, in accordance with the DC bus-voltage value within the converter unit 3, enables the open/close operation of the contact of the third contactor 9 provided outside the converter units 3.

After the lapse of the time $\Delta t1$ since the DC-voltage detection value exceeds the voltage threshold 100 at the time of power-on, the control unit 50 switches the contact of the first contactor 22 and the contact of the second contactor 60 from the opened state to the closed state. In the converter unit system 92, when the capacitances of the smoothing capacitors 30 in the converter units 3 connected in parallel differ from each other, the value of the DC voltage across the both ends of the smoothing capacitor 30, that is, the DC-voltage detection value detected by the voltage detection unit 40 results in a value that differs for each of the converter units 3. If the DC-voltage detection values differ from each other, when the first contactor 22 of one of the converter units 3 is turned on, the first contactor 22 of the other converter unit 3 may remain unchanged in the off state. When only the one of the first contactors 22 is brought to the on state, a surge current that flows through the converter units 3 at the time of turning-on of the power to the converter units 3 flows intensively only toward the converter unit 3 in which the first contactor 22 is on. The flow of the surge current concentrating in the converter unit 3 causes a heavy load on the parts within the converter unit 3. In contrast to this, the control unit 50 of the first embodiment switches the first contactor 22 from off to on after the lapse of the time Δt1 since the DC-voltage detection value of the smoothing capacitor 30 exceeds the voltage threshold 100. This can suppress the flow of a surge current from concentrating in some of the converter units at the time of power-on.

When all the second contactors 60 are turned on, that is, when the contacts are all closed, the power-supply circuit 90 closes the third contactor 9. Accordingly, after the second contactors 60 of all the converter units 3 are closed, an AC current can flow through a path that bypasses the inrush-current suppression resistor 8. This can suppress flow of a large surge current through some of the converter units 3. Thus, flow of a large inrush current into some of the converter units 3 can be suppressed without providing a voltage detection circuit on the outside of the converter units 3. This can take an average of the amounts of inrush current that flows through the converter units connected in parallel. Further, it is possible to simplify the high-capacity converter unit system. That is, when the converter units 3 are connected in parallel to construct a high-capacity converter unit system, it is possible to perform the control to suppress the inrush-current collectively on the outside of the converter units 3, without requiring a voltage detection circuit provided outside the converter units 3, by using a contact signal of the second contactor 60 that is output to the outside of the converter unit 3 by controlling the second contactor 60 provided within the converter unit 3 such that it is turned on/off. This can not only reduce the difference in the amount of inrush current that flows through each of the converter units 3 connected in parallel, but can also simplify the high-capacity converter unit system because an external voltage detection circuit is not required.

In the power-supply circuit 90 illustrated in FIG. 1, the converter unit system in which two converter units 3 are connected in parallel has been described as an example. In a converter unit system in which three or more converter units 3 are connected in parallel, the effects similar to those of the converter unit system described above can be obtained by providing the second contactor 60 and the terminals 70 and connecting the terminal 70 to the second inrush-current suppression resistor 8 and to the third contactor 9, as in the case where the two converter units 3 are connected in parallel.

Second Embodiment

In the first embodiment, simultaneously with outputting a control signal for turning on or off the first contactor 22, the control unit 50 outputs a control signal for turning on or off the second contactor 60. In a second embodiment, after a lapse of a predetermined time since the control unit 50 outputs a control signal for turning on the first contactor 22, the control unit 50 outputs a control signal for turning on the second contactor 60. Also, after a lapse of a predetermined time since the control unit 50 outputs a control signal for turning off the second contactor 60, the control unit 50 outputs a control signal for turning off the first contactor 22.

Specifically, when the breaker 7 is closed to supply power to a converter system from the AC power supply 1, the power-supply circuit 90 operates the converter system in the following manner. First, the control unit 50 in the converter unit 3a brings the second contactor 60 in the converter unit 3a to an OFF state. Also, the control unit 50 in the converter unit 3b brings the second contactor 60 in the converter unit 3b to an OFF state. As a result, the contact of the third contactor 9 still remains in an opened state, that is, in an OFF state.

Figure 4:
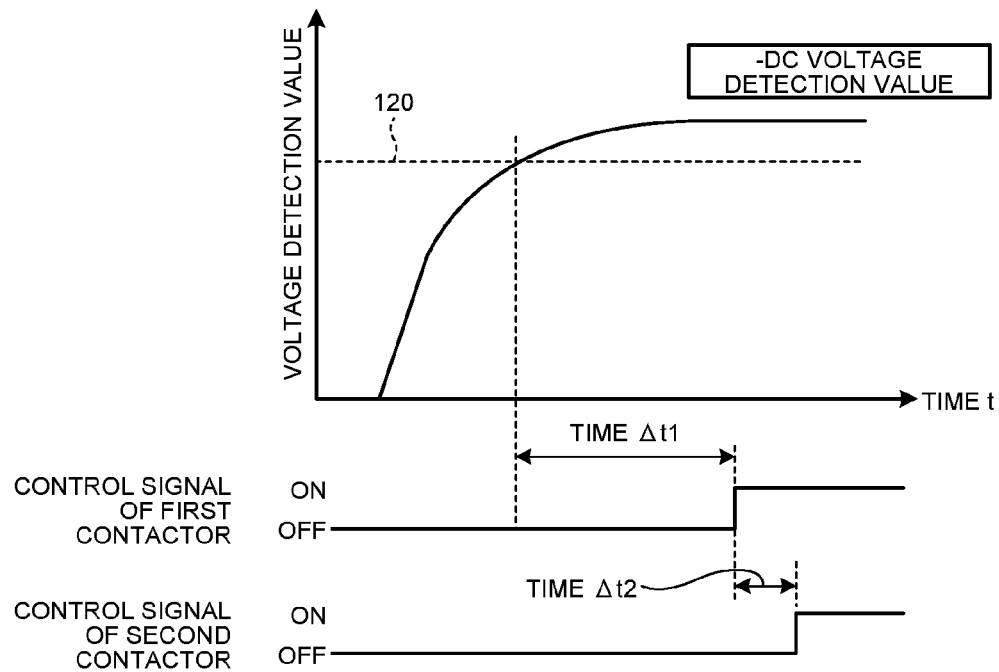

Thereafter, as illustrated in FIG. 4, the control unit 50 compares the value of the DC voltage across the both ends of the smoothing capacitor 30, that is, the DC-voltage detection value with a predetermined voltage threshold 120 at which the first contactor 22 is turned on. After a lapse of a time Δt1 since the DC-voltage detection value exceeds the threshold 120, the control unit 50 switches the signal for controlling the first contactor 22 in the converter unit 3a from off to on. On the basis of this control signal, the contact of the first contactor 22 in the converter unit 3a is closed.

After a lapse of a time Δt2 since the control unit 50 in the converter unit 3a outputs the control signal to the first contactor, the control unit 50 switches the signal for controlling the second contactor 60 in the converter unit 3a from off to on. When the ON control signal is input to the second contactor 60, its contact is closed. Simultaneously with this, the control unit 50 in the converter unit 3b also outputs a control signal for closing the contact of the first contactor 22 and the contact of the second contactor 60 in the converter unit 3b in the same manner as the control unit 50 in the converter unit 3a. When the contact of the second contactor 60 in the converter unit 3a and the contact of the second contactor 60 in the converter unit 3b are both closed, the contact of the third contactor 9 provided outside the converter units 3a and 3b is closed. Because the contact of the third contactor 9 is closed, the operation of suppressing an inrush current is completed.

Figure 5:
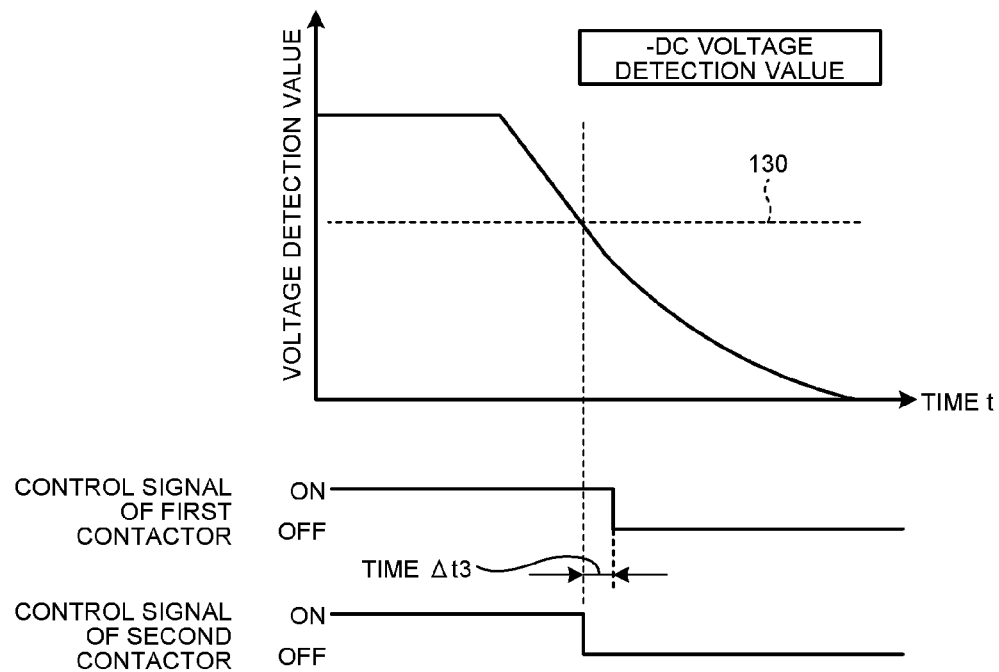
FIG. 5 is a diagram illustrating a relation between a control signal of the first contactor and a control signal of the second contactor and a DC-voltage detection value when the converter unit system according to the second embodiment is turned off.

When the breaker 7 is opened to turn off the power, the converter unit 3 is turned off. At this time, as illustrated in FIG. 5, the control unit 50 in the converter unit 3a compares the DC-voltage detection value of the smoothing capacitor 30 in the converter unit 3a with a predetermined voltage threshold 130 at which the second contactor 60 in the converter unit 3a is turned off. When the DC-voltage detection value of the smoothing capacitor 30 in the converter unit 3a becomes equal to or smaller than the voltage threshold 130, the control unit 50 switches the signal for controlling the second contactor 60 in the converter unit 3a from on to off. The second contactor 60 in the converter unit 3a opens its contact when the OFF control signal is input thereto. After a lapse of a time Δt3 since the control unit 50 in the converter unit 3a outputs the control signal to the second contactor 60 in the converter unit 3a, the control unit 50 switches the signal for controlling the first contactor 22 in the converter unit 3a from on to off. The first contactor 22 in the converter unit 3a opens its contact when the OFF control signal is input thereto.

The control unit 50 in the converter unit 3b also opens the contact of the first contactor 22 and the contact of the second contactor 60 in the converter unit 3b in the same manner as the control unit 50 in the converter unit 3a described above.

In the power-supply circuit 90, when the contact of the second contactor 60 in the converter unit 3a and the contact of the second contactor 60 in the converter unit 3b are both opened, the contact of the third contactor 9 is opened.

According to the second embodiment of the present invention, the third contactor 9 provided outside the converter unit 3 is closed at a timing with a certain time delay from a timing at which the first contactor 22 in the converter unit 3 is closed. Therefore, the smoothing capacitor 30 can be brought to a charged state by the time the third contactor 9 is closed. Further, the third contactor 9 is opened at a timing with a certain time delay from a timing at which the first contactor 22 in the converter unit 3 is closed or opened. Therefore, the third contactor 9 provided outside the converter unit 3 can collectively perform a control to suppress an inrush current that flows through the smoothing capacitor 30 in the converter unit 3 and an inrush current that flows through the smoothing capacitor 80 in the inverter unit 5. Therefore, variation in the operational threshold of the inrush-current suppression circuits 20 within the converter units 3 connected in parallel does not cause the flow of an inrush current to concentrate in one of the converter units 3 and thus does not cause a large current to flow through the inrush-current suppression resistor 21 or the diode element 11, 12, 13, 14, 15, or 16.

Third Embodiment

In a third embodiment, when the breaker 7 is closed to supply power to the converter system from the AC power supply 1, the contact of the third contactor 9 remains in an opened state. Thereafter, when the third contactor 9 is closed, the smoothing capacitor 30 in the converter unit 3, and also the smoothing capacitor 80 in the inverter unit 5 connected in series to the converter unit 3, are charged through the second inrush-current suppression resistor 8.

Figure 6:
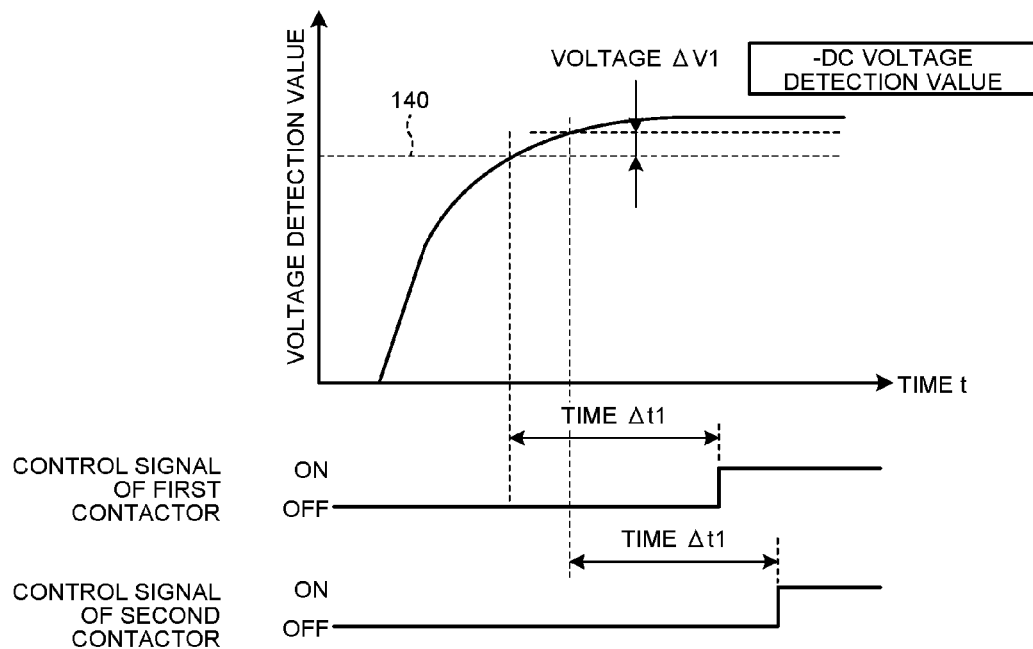

At this time, as illustrated in FIG. 6, the control unit 50 in the converter unit 3a compares the value of the DC voltage across the both ends of the smoothing capacitor 30, that is, the DC-voltage detection value with a predetermined voltage threshold 140 at which the first contactor is turned on. After a lapse of a time Δt1 since the DC-voltage detection value exceeds the voltage threshold 140, the control unit 50 switches the signal for controlling the first contactor 22 in the converter unit 3a from off to on. The first contactor 22 in the converter unit 3a closes its contact when the ON signal is input thereto.

The control unit 50 in the converter unit 3a compares the value of the DC voltage across the both ends of the smoothing capacitor 30, that is, the DC-voltage detection value with a voltage value obtained by adding a predetermined first voltage value ΔV1 to the predetermined voltage threshold 140 at which the first contactor 22 is turned on. After a lapse of the time Δt1 since the DC-voltage detection value exceeds the voltage value, the control unit 50 in the converter unit 3a switches the signal for controlling the second contactor 60 in the converter unit 3a from off to on. The second contactor 60 in the converter unit 3a closes its contact when the ON control signal is input thereto. Thus, the operation of suppressing an inrush current is completed. Simultaneously with this, the control unit 50 in the converter unit 3b also outputs a control signal for closing the contact of the first contactor 22 and the contact of the second contactor 60 in the converter unit 3b in the same manner as the control unit 50 in the converter unit 3a described above. When the contacts of the second contactors 60 in the converter units 3a and 3b are both closed, the contact of the third contactor 9 is closed.

Figure 7:
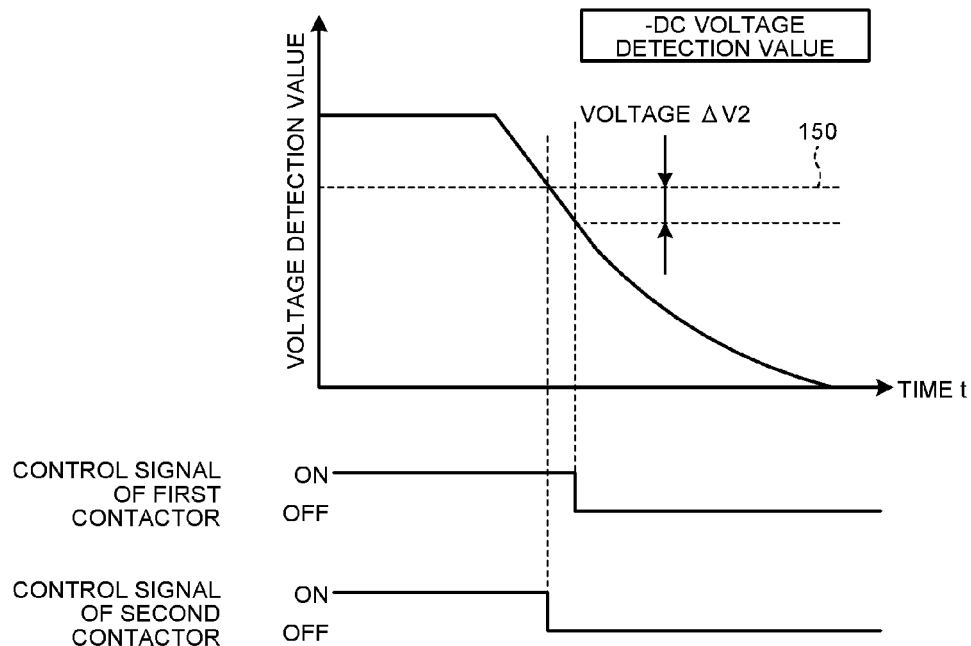
FIG. 7 is a diagram illustrating a relation between a control signal of the first contactor and a control signal of the second contactor and a DC-voltage detection value when the converter unit system according to the third embodiment is turned off.

When the breaker 7 is opened to turn off the power, the converter unit 3a is turned off. At this time, as illustrated in FIG. 7, the control unit 50 in the converter unit 3a compares the DC-voltage detection value of the smoothing capacitor 30 in the converter unit 3a with a predetermined voltage threshold 150 at which the second contactor 60 in the converter unit 3a is turned off. When the DC-voltage detection value of the smoothing capacitor 30 in the converter unit 3a becomes equal to or smaller than the voltage threshold 150, the control unit 50 switches the signal for controlling the second contactor 60 in the converter unit 3a from on to off. The second contactor 60 in the converter unit 3a opens its contact when the OFF control signal is input thereto.

Thereafter, when the DC-voltage detection value of the smoothing capacitor 30 in the converter unit 3a becomes equal to or smaller than a voltage value 150 obtained by subtracting a predetermined second voltage value ΔV2 from the voltage threshold at which the second contactor 60 is turned off, the control unit 50 switches the signal for controlling the first contactor 22 in the converter unit 3a from on to off. The first contactor 22 in the converter unit 3a opens its contact when the OFF control signal is input thereto. Simultaneously with this, the control unit 50 in the converter unit 3b also outputs a control signal for opening the contact of the first contactor 22 and the contact of the second contactor 60 in the converter unit 3b in the same manner as the control unit 50 in the converter unit 3a described above. When the contacts of the second contactors 60 in the converter units 3a and 3b are both opened, the contact of the third contactor 9 is opened.

According to the third embodiment of the present invention, the control is performed in such a manner that at the time of power-on, the third contactor 9 provided outside the converter unit 3 is closed after the first contactor 22 in the converter unit 3 is closed, and, at the time of power-off, the contact of the third contactor 9 provided outside the converter unit 3 is opened before the first contactor 22 within the converter unit is opened. Accordingly, it becomes possible for the third contactor provided outside the converter unit 3 to collectively perform a power-off operation. Therefore, for example, variation in detected voltage in the voltage detection units 40 in the converter units 3 or variation in the operational time of the first contactors 22 within the converter units 3 does not cause the flow of an inrush current to concentrate in one of the converter units when the power is turned on again or the power supply is restored after an instantaneous power interruption and thus does not cause a large current to flow through the diode element 11, 12, 13, 14, 15, or 16.

The configuration described in the above embodiments is only an example of the content of the present invention, and the configuration can be combined with other publicly known techniques, and a part of the configuration can be omitted or modified without departing from the scope of the present invention.

REFERENCE SIGNS LIST

1 AC power supply, 2 reactor, 3 converter unit, 4 DC bus, 5 inverter unit, 6 electric motor, 7 breaker, 8 second inrush-current suppression resistor, 9 third contactor, 10 converter circuit, 11, 12, 13, 14, 15, 16 diode element, 20 inrush-current suppression circuit, 21 first inrush-current suppression resistor, 22 first contactor, 30 smoothing capacitor, 40 voltage detection unit, 50 control unit, 60 second contactor, 70 terminal, 80 smoothing capacitor, 90 power-supply circuit, 92 converter unit system, 100, 110, 120, 130, 140, 150 voltage threshold.

The invention claimed is:

1. A converter unit system comprising:
a first converter unit connected in parallel to a second converter unit, wherein each of the first and second converter units is connected to an AC power supply and a DC bus, and comprises:
a converter circuit that rectifies an AC voltage input from the AC power supply to a DC voltage, and outputs the DC voltage to the DC bus;
a first inrush-current suppression resistor that is connected to the DC bus;
a first contactor that is connected in parallel to the first inrush-current suppression resistor;
a smoothing capacitor that is provided on the DC bus on a side further from the AC power supply than the first inrush-current suppression resistor and the first contactor;
a second contactor that outputs an ON signal or an OFF signal to an external source;
a voltage detection unit that measures a value of the DC voltage across both ends of the smoothing capacitor;
a control unit that controls the first contactor and the second contactor on a basis of the value of the DC voltage detected by the voltage detection unit;
a third contactor that is connected to the first converter unit and the second converter unit and to the AC power supply; and
a second inrush-current suppression resistor that is connected in parallel to the third contactor,
wherein a contact of the second contactor of the first converter unit is connected to one side of a coil of the third contactor,
a contact of the second contactor of the second converter unit is connected to other side of the coil of the third contactor,
the second contactor of the first converter unit is connected in series with the second contactor of the second converter unit,
a contact of the third contactor is closed in response to the coil of the third contactor being energized by current flowing through the coil when the contacts of the second contactor of the first converter unit and the second converter unit are closed, and
the contact of the third contactor is opened when at least one among the contact of the second contactor of the first converter unit and the contact of the second contactor of the second converter unit is opened, thereby de-energizing the coil of the third contactor.

2. The converter unit system according to claim 1, wherein
at a time of power-on, the control unit outputs a signal for closing a contact of the first contactor after a lapse of a first predetermined time since the DC voltage across the both ends of the smoothing capacitor becomes equal to or higher than a first predetermined value, and, outputs a signal for closing the contact of the second contactor after a lapse of a second predetermined time since the control unit outputs the signal for closing the contact of the first contactor, and
at a time of power-off, the control unit outputs a signal for opening the contact of the second contactor when the DC voltage across the both ends of the smoothing capacitor becomes equal to or lower than a second predetermined value, and, outputs a signal for opening the contact of the first contactor after a lapse of a third predetermined time since the control unit outputs the signal for opening the contact of the second contactor.

3. The converter unit system according to claim 1, wherein
at a time of power-on, the control unit outputs a signal for closing a contact of the first contactor after a lapse of a first predetermined time since the DC voltage across the both ends of the smoothing capacitor becomes equal to or higher than a first predetermined value, and, outputs a signal for closing the contact of the second contactor after a lapse of a second predetermined time since the DC voltage across the both ends of the smoothing capacitor becomes equal to or higher than a first value that is obtained by adding a predetermined first voltage value to the first predetermined value, and
at a time of power-off, the control unit outputs a signal for opening the contact of the second contactor when the DC voltage across the both ends of the smoothing capacitor becomes equal to or lower than a second predetermined value, and outputs a signal for opening the contact of the first contactor when the DC voltage across the both ends of the smoothing capacitor becomes equal to or lower than a second value that is obtained by subtracting a predetermined second voltage value from the second predetermined value.

4. A converter unit comprising:
a first converter unit connected in parallel to a second converter unit, each of the first and second converter units including:
a converter circuit that rectifies an AC voltage input from an AC power supply to a DC voltage and outputs the DC voltage to a DC bus;
a first inrush-current suppression resistor that is connected to the DC bus;
a first contactor that is connected in parallel to the first inrush-current suppression resistor;
a smoothing capacitor that is provided on the DC bus on a side further from the AC power supply than the first inrush-current suppression resistor and the first contactor;
a second contactor that outputs an ON signal or an OFF signal to an external source;
a voltage detection unit that measures a value of the DC voltage across both ends of the smoothing capacitor; and
a control unit that controls the first contactor and the second contactor on a basis of the value of the DC voltage detected by the voltage detection unit,
wherein the second contactor of the first converter unit is connected in series with the second contactor of the second converter unit and connected to a third contactor and a second inrush-current suppression resistor that are disposed in parallel,
a contact of the second contactor of the first converter unit is connected to one side of a coil of the third contactor,
a contact of the second contactor of the second converter unit is connected to other side of the coil of the third contactor,
a contact of the third contactor is closed in response to the coil of the third contactor being energized by current flowing through the coil when the contact of the second contractors of the first converter unit and the second converter unit are closed, and
the contact of the third contactor is opened when at least one among the contact of the second contactor of the first converter unit and the contact of the second contactor of the second converter unit is opened, thereby de-energizing the coil of the third contactor.

5. The converter unit according to claim 4, wherein
at a time of power-on, and after a lapse of a first predetermined time since the DC voltage across the both ends of the smoothing capacitor becomes equal to or higher than a first predetermined value, the control unit outputs a signal for closing a contact of the first contactor, and
at a time of power-off, when the DC voltage across the both ends of the smoothing capacitor becomes equal to or lower than a second predetermined value, the control unit outputs a signal for opening the contact of the first contactor.

6. The converter unit according to claim 4, wherein
at a time of power-on, the control unit outputs a signal for closing a contact of the first contactor after a lapse of a first predetermined time since the DC voltage across the both ends of the smoothing capacitor becomes equal to or higher than a first predetermined value, and, outputs a signal for closing the contact of the second contactor after a lapse of a second predetermined time since the control unit outputs the signal for closing the contact of the first contactor, and
at a time of power-off, the control unit outputs a signal for opening the contact of the second contactor when the DC voltage across the both ends of the smoothing capacitor becomes equal to or lower than a second predetermined value, and, outputs a signal for opening the contact of the first contactor after a lapse of a third predetermined time since the control unit outputs the signal for opening the contact of the second contactor.

7. The converter unit according to claim 4, wherein
at a time of power-on, the control unit outputs a signal for closing a contact of the first contactor after a lapse of a first predetermined time since the DC voltage across the both ends of the smoothing capacitor becomes equal to or higher than a first predetermined value, and, outputs a signal for closing the contact of the second contactor after a lapse of a second predetermined time since the DC voltage across the both ends of the smoothing capacitor becomes equal to or higher than a first value that is obtained by adding a predetermined first voltage value to the first predetermined value, and
at a time of power-off, the control unit outputs a signal for opening the contact of the second contactor when the DC voltage across the both ends of the smoothing capacitor becomes equal to or lower than a second predetermined value, and outputs a signal for opening the contact of the first contactor when the DC voltage across the both ends of the smoothing capacitor becomes equal to or lower than a second value that is obtained by subtracting a predetermined second voltage value from the second predetermined value.

* * * * *